United States Patent [19]
Uemichi

[11] Patent Number: 5,516,602
[45] Date of Patent: May 14, 1996

[54] EXHAUST STRUCTURE OF STORAGE BATTERY

[75] Inventor: Sachio Uemichi, Takatsuki, Japan

[73] Assignee: Yuasa Corporation, Osaka, Japan

[21] Appl. No.: 457,104

[22] Filed: Jun. 1, 1995

[30] Foreign Application Priority Data

Jul. 7, 1994 [JP] Japan .................................. 6-155774

[51] Int. Cl.$^6$ .................................................. H01M 2/12
[52] U.S. Cl. ................... 429/82; 429/84; 429/89
[58] Field of Search ..................... 429/82, 83, 84, 429/87, 88, 89, 53

[56] References Cited

U.S. PATENT DOCUMENTS

| | | | |
|---|---|---|---|
| 4,207,387 | 6/1980 | Jutte | 429/88 |
| 4,306,002 | 12/1981 | Heiser et al. | 429/84 |
| 4,403,019 | 9/1983 | Poe | 429/53 |
| 4,486,516 | 12/1984 | Poe | 429/82 |

*Primary Examiner*—Anthony Skapars
*Attorney, Agent, or Firm*—Evenson, McKeown, Edwards & Lenahan

[57] ABSTRACT

An exhaust structure of this invention is composed of plural exhaust structure elements which are installed in a cover and arranged in horizontal positions facing on cell chambers. The exhaust structure element is provided with a gas intake chamber, a refluxing chamber and a passage chamber. The gas intake chamber connects to the refluxing chamber through a first slit, and the refluxing chamber connects to the passage chamber through a second slit. A baffle plate is installed in the gas intake chamber, pin-shaped bodies are installed on ceilings of the refluxing chamber and the passage chamber, a refluxing hole is made on a bottom surface of the refluxing chamber, and the refluxing hole connects to a cylindrical body. Bottom surfaces of the refluxing chamber and the passage chamber are slanted toward the refluxing hole. According to the exhaust structure of this invention, its composition is simple and can provide effective exhaust of gas, separation of electrolyte from the gas, and reflux of the separated electrolyte.

3 Claims, 7 Drawing Sheets

EXHAUST STRUCTURE OF STORAGE BATTERY

BACKGROUND OF THE INVENTION

This invention relates to an exhaust structure installed on a cover of storage battery which permits gas to be exhausted while preventing electrolyte from flowing out.

In a storage battery, there is an exhaust structure which permits gas to be exhausted while preventing electrolyte from flowing out, as disclosed in U.S. Pat. No. 4,486,516 for example. This is an invention in which electrolyte is separated from gas while permitting gas to flow in horizontal direction. In the exhaust structure having this construction, however, a composition of a part for refluxing the electrolyte separated from the gas to a container becomes complicated further in combination with a structure for preventing reversed flow. In addition, there is a fear that electrolyte adhering to a ceiling is not refluxed but exhausted outside together with the gas, because a composition is not provided wherein electrolyte dewed on the ceiling of a chamber composing the exhaust structure is positively dropped.

SUMMARY OF THE INVENTION

An object of this invention is to provide an exhaust structure of storage battery of a type for permitting gas to flow in a horizontal direction, which is simple in its structure and effectively able to carry out exhaust of gas, separation of electrolyte from the gas and reflux of the separated electrolyte.

This invention provides an exhaust structure of storage battery installed on a cover of a storage battery and permitting gas to be exhausted while preventing electrolyte from flowing out, in which the exhaust structure has exhaust structure elements equipped with gas intake chambers, refluxing chambers and passage chambers, in such a way that they face on every cell chambers of containers and arranged in horizontal positions in an arranged direction of cell chambers; the gas intake chamber opens downward, the gas intake chamber and the refluxing chamber adjacent to it connect each other through a vertical first slit formed on a partition wall, and the refluxing chamber and the passage chamber adjacent to it connect each other through a vertical second slit formed on the partition wall; the adjoining passage chambers of the exhaust structure elements connect each other through a clearance at an upper part of the partition wall; the gas intake chamber has a baffle plate having at least a part projecting approximately in horizontal direction from a lower edge of the first slit; the refluxing chamber has on its ceiling a large number of pin-shaped bodies extending downward and has a refluxing hole on its bottom surface, the refluxing hole connects to a cylindrical body extending downward, and the cylindrical body has such a sufficient length that its tip end can be dipped in the electrolyte; the passage chamber has on its ceiling a large number of pin-shaped bodies extending downward; the bottom surfaces of the passage chamber and the refluxing chamber are slanted toward the refluxing hole; and exhaust passages connecting outside through filters are formed on the ceilings of the passage chambers of the exhaust structure elements located at both ends.

The exhaust structure having the above composition offers the following functions.

In each exhaust structure element, gas produced in the container passes through the gas intake chamber, the first slit, the refluxing chamber and the second slit to the passage chamber. It moves to the passage chamber of the adjoining exhaust structure element. Then, it is exhausted outside through the exhaust passage from the passage chambers located at both sides of the exhaust structure. In this instance, the electrolyte in the gas is dewed on the pin-shaped bodies of the refluxing chamber and the passage chamber, so as to drop on bottom surfaces of the refluxing chamber and the passage chamber, flows toward the refluxing hole, and passes through it and drops in the cylindrical body so as to be refluxed into the container. In this way, the electrolyte is separated from the gas so that only the gas is exhausted while the electrolyte is refluxed.

Since there exist the pin-shaped bodies, the electrolyte is not dewed on the ceilings of the refluxing chamber and passage chamber. In other words, there is no chance for the electrolyte to remain while adhering to the ceiling as it is. Accordingly, the electrolyte refluxed with a good efficiency.

The electrolyte dropped on the bottom surfaces of the refluxing chamber and passage chamber flows smoothly toward the refluxing hole because the bottom surfaces are slant toward the refluxing hole.

The electrolyte coming to the refluxing hole is so dropped as to be sucked into the cylindrical body due to fluctuation of air pressure in the cylindrical body caused by fluctuation of a surface of electrolyte in the container.

Even when the electrolyte is splashed up due to violent shaking of storage battery, there is scarcely a chance for the electrolyte to come directly into the refluxing chamber through the first slit because the baffle plate is installed in the gas intake chamber.

In the exhaust structure having the above composition, the following compositions (1) and (2) may be used.

(1) The baffle plate projects from a lower edge of the first slit in approximately horizontal direction, and its tip end stands upward.

According to this composition, the electrolyte is positively prevented from coming directly into the refluxing chamber through the first slit even when the electrolyte is splashed up due to the violent shaking of storage battery.

(2) The bottom surfaces of the passage chamber and the refluxing chamber are slanted also toward a line extending through the refluxing hole and the second slit.

According to this composition, the electrolyte on the bottom surface of passage chamber flows smoothly through the second slit and toward the refluxing hole together with the electrolyte on the bottom surface of refluxing chamber.

DESCRIPTION OF THE PREFERRED EMBODIMENT

An embodiment of this invention will be described hereunder with reference to drawings.

Figure 1:
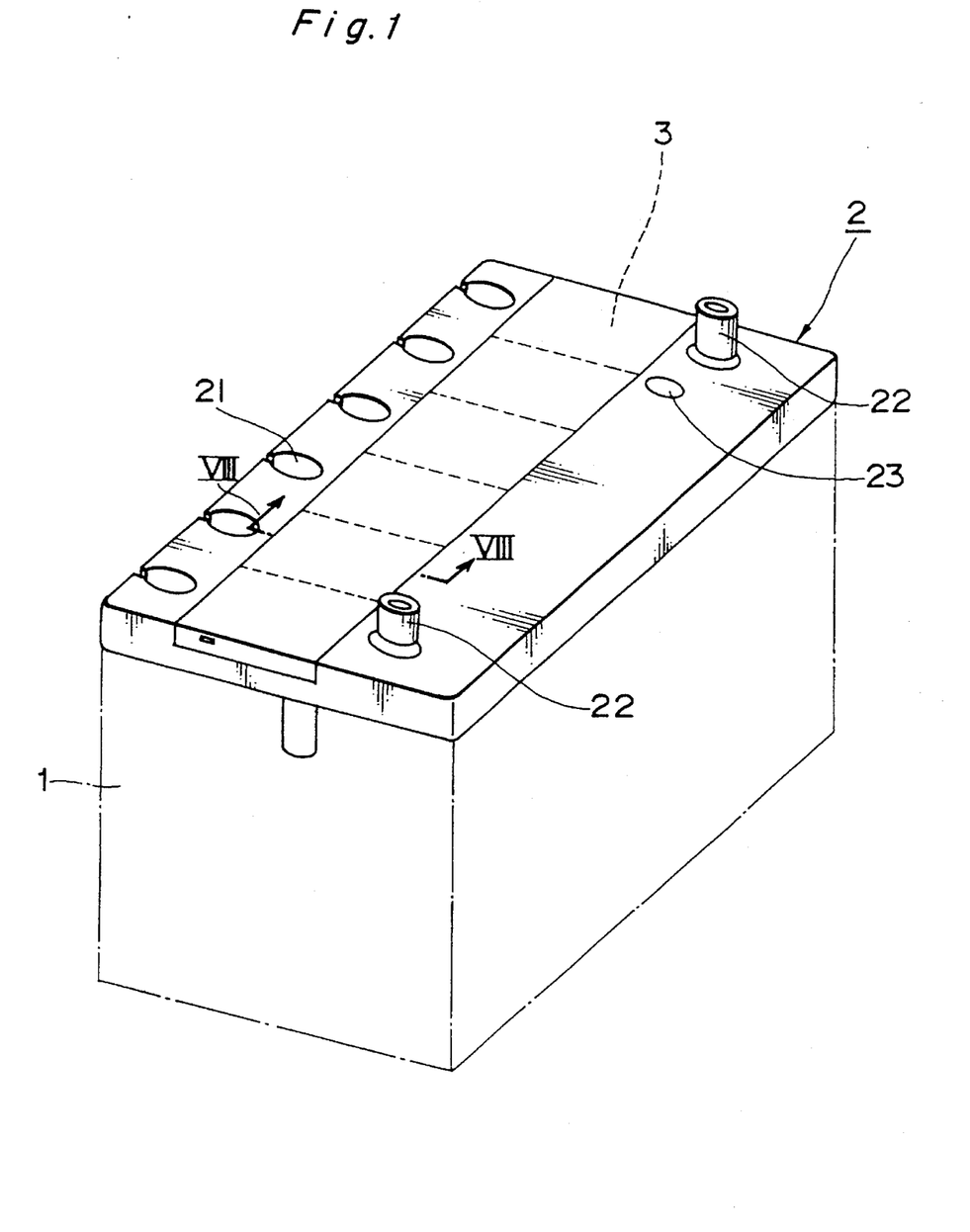
FIG. 1 is a general oblique view showing a storage battery equipped with an exhaust structure of this invention.

FIG. 1 is a general oblique view showing the storage battery equipped with an exhaust structure of this invention. 1 is a container and 2 is a cover. An exhaust structure 3 of this invention is installed in the cover 2. An electrolyte filling port 21, an external terminal 22 and an indicator hole 23 etc. are made on the cover 2.

Figure 2:
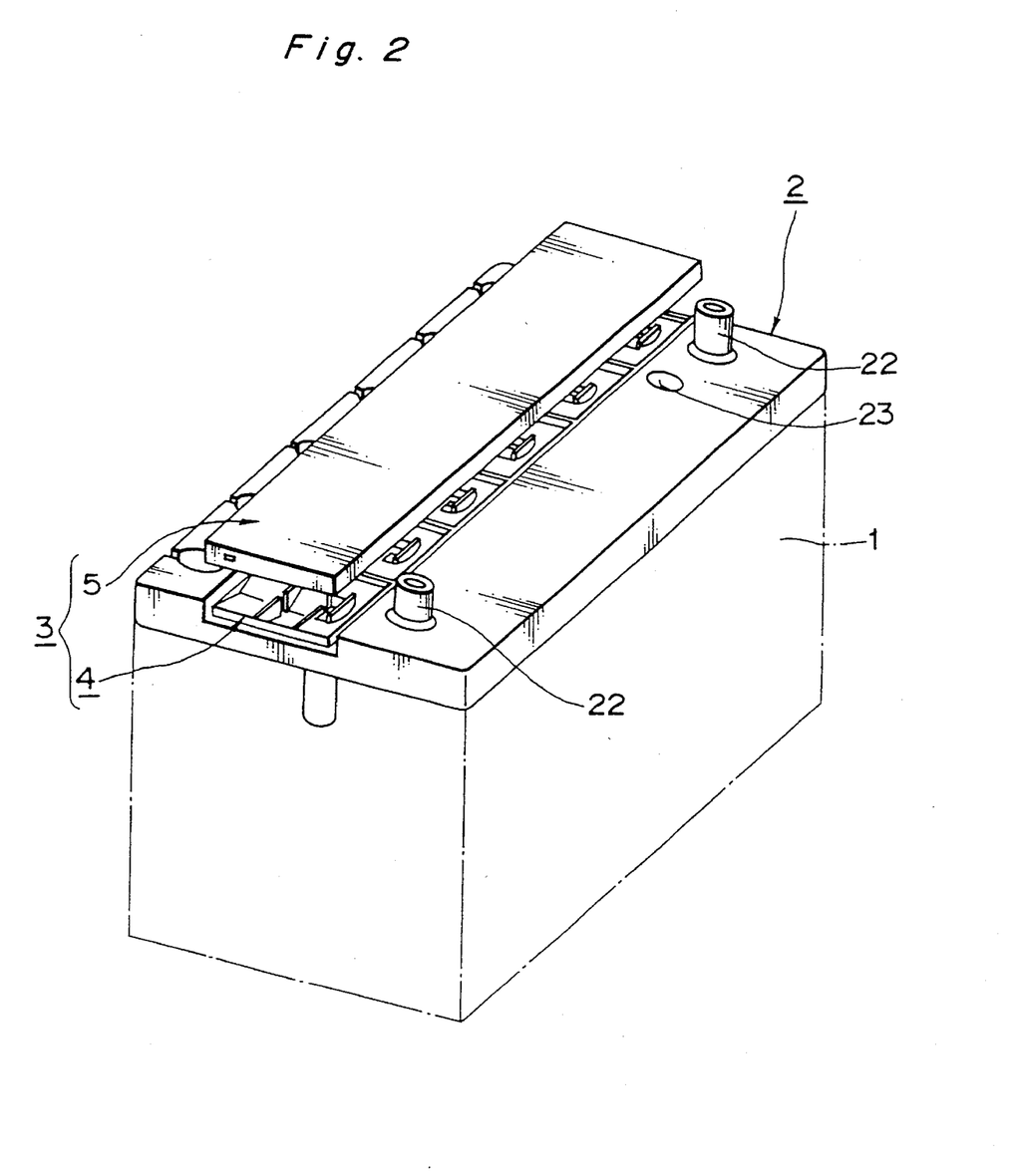
FIG. 2 is a partially exploded oblique view of FIG. 1.

The exhaust structure 3 is so constructed that an upper structure 5 is jointed by melting to a lower structure 4 so as to cover it, which is formed at a laterally middle part of the cover in its longitudinal direction, as illustrated in FIG. 2.

Figure 3:
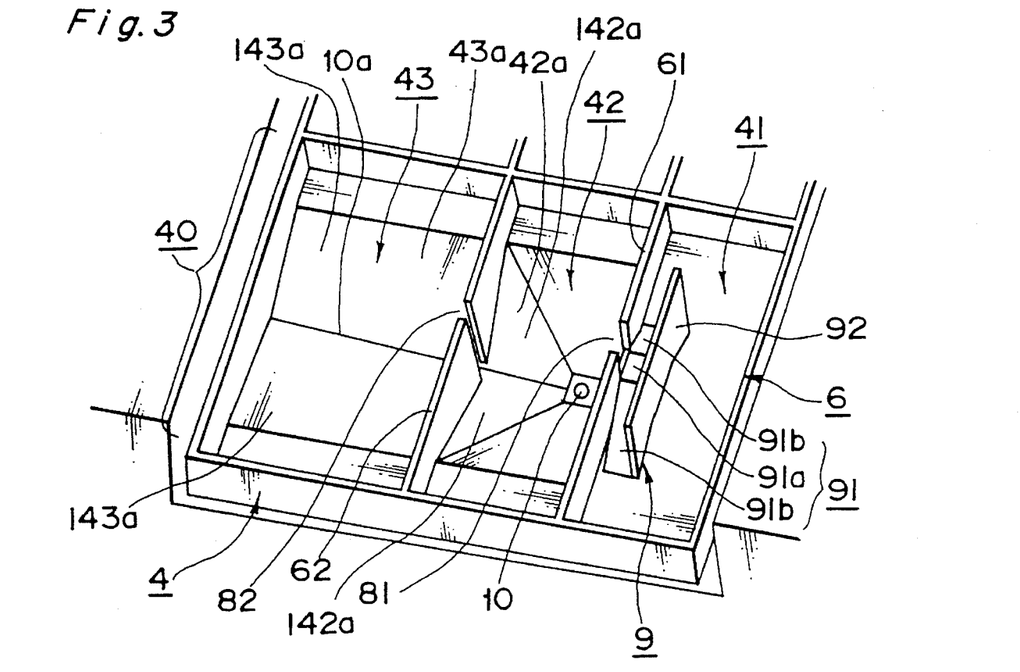
FIG. 3 is a partial oblique view showing a lower structure composing the exhaust structure of this invention.
Figure 4:
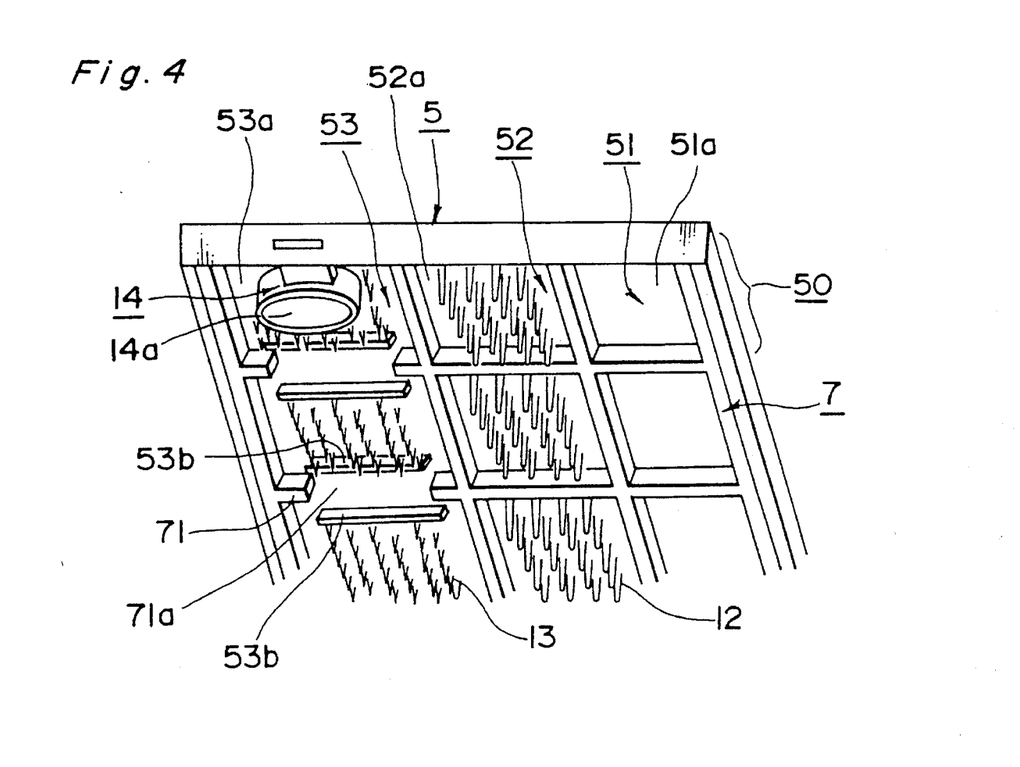
FIG. 4 is a partial oblique view showing a backside of an upper structure composing the exhaust structure of this invention.
Figure 5:
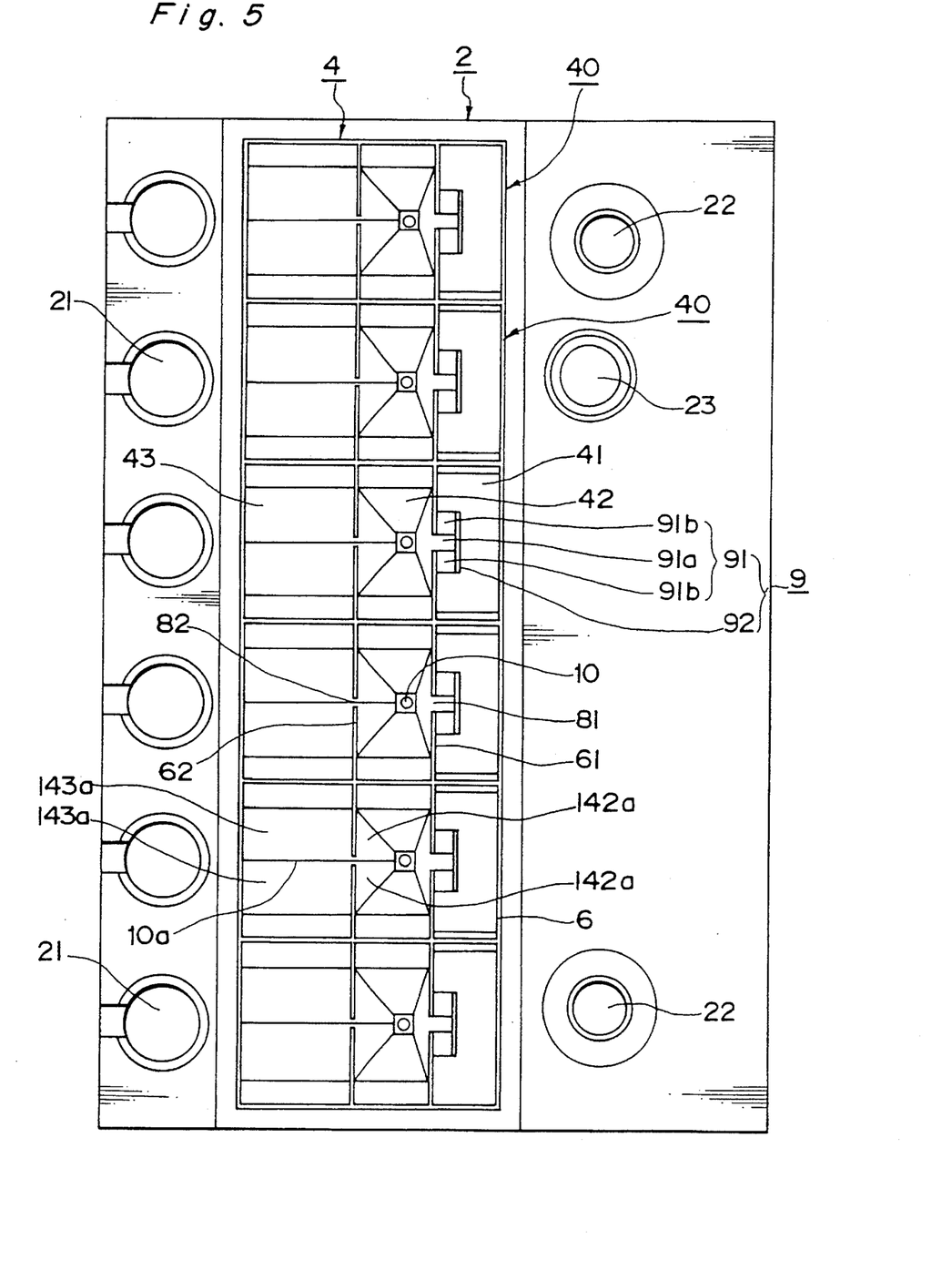
FIG. 5 is a plan view showing a cover under a state where the upper structure is removed from it.
Figure 6:
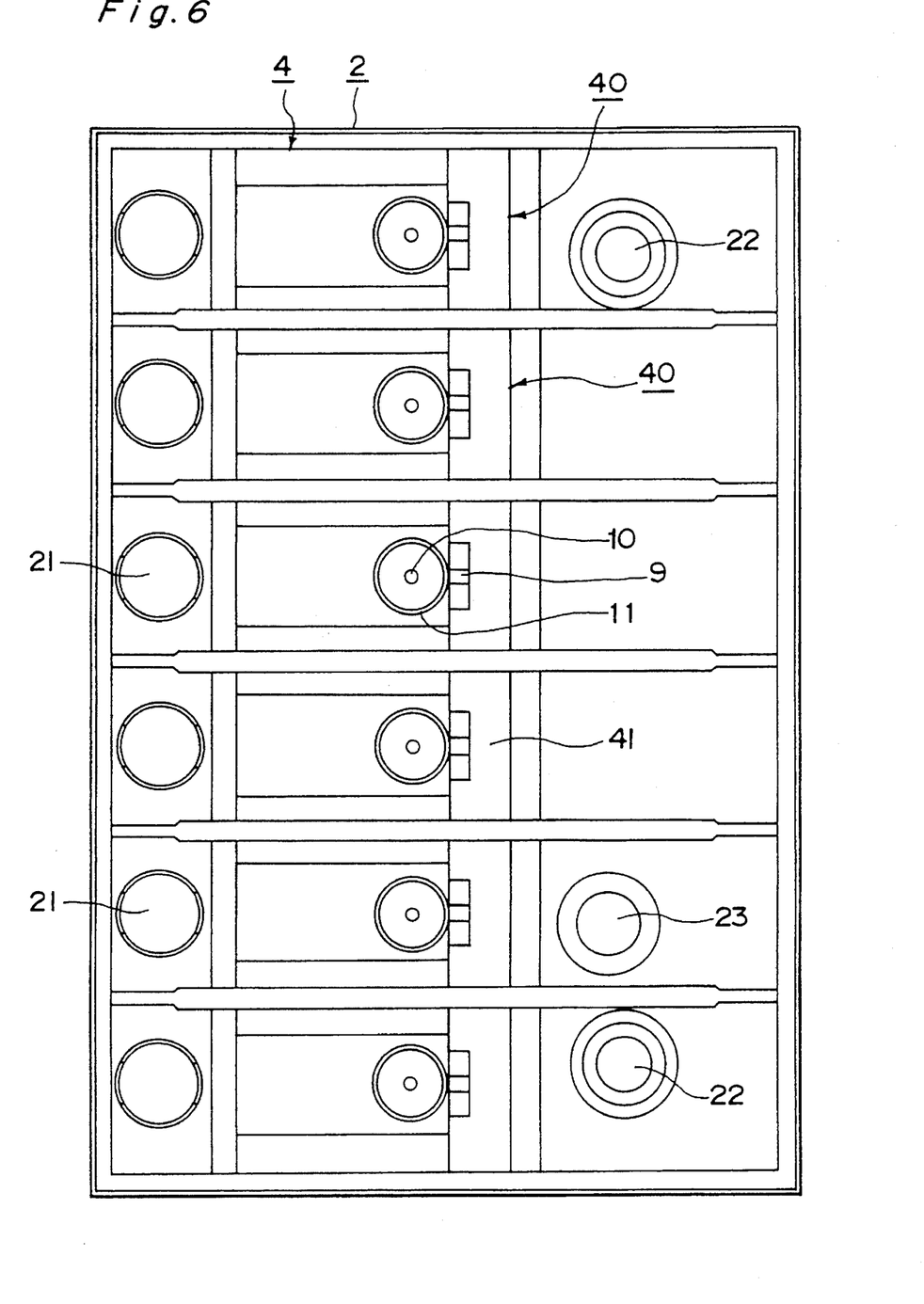
FIG. 6 is a backside view showing a cover under a state where the upper structure is removed from it.
Figure 7:
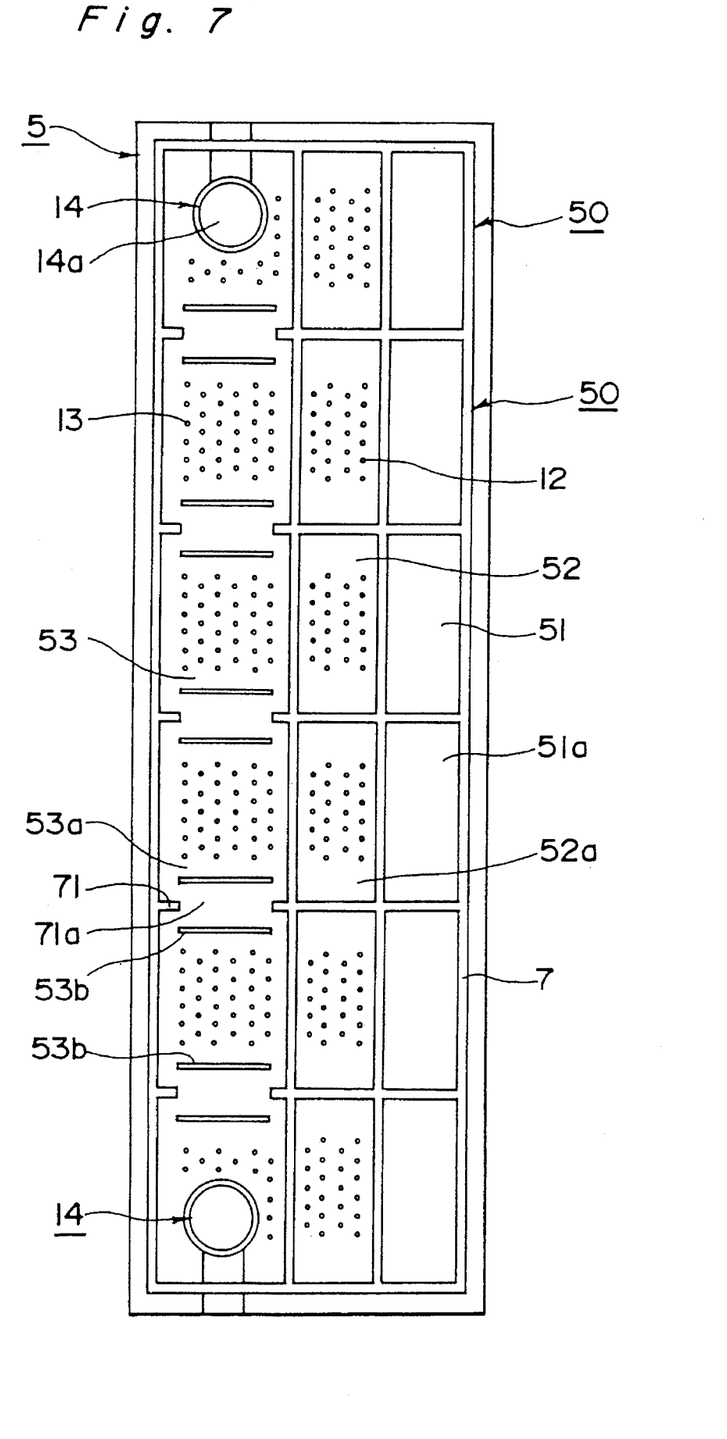
FIG. 7 is a backside view showing the upper structure.
Figure 8:
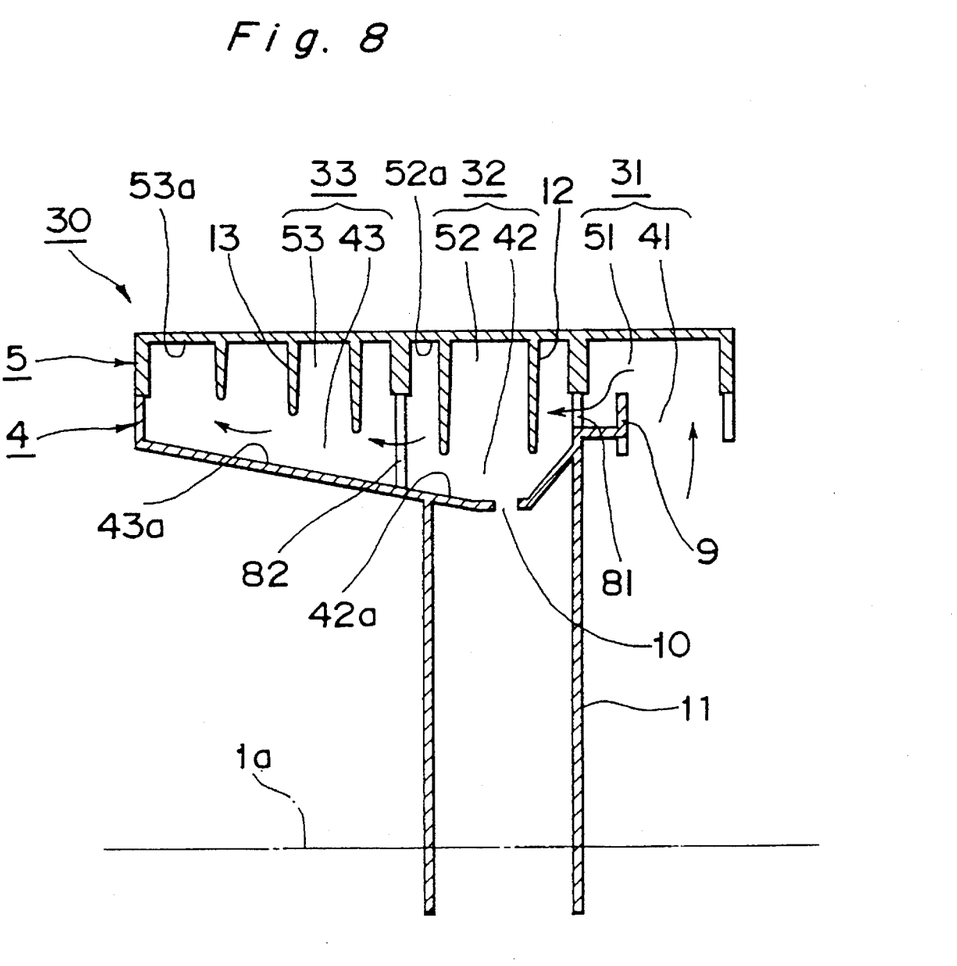
FIG. 8 is a sectional view taken on a line VIII—VIII of FIG. 1.

FIG. 3 is a partial oblique view showing the lower structure 4. FIG. 4 is a partial oblique view showing the backside of the upper structure 5. FIG. 5 is a plan view showing the cover 2 under the state where the upper structure 5 is removed from it. FIG. 6 is a backside view of the same. FIG. 7 is a backside view showing the upper structure 5. FIG. 8 is a sectional view taken on the line VIII—VIII of FIG. 1. The lower structure 4 is composed of lower structure elements 40 shown in FIG. 3 which are installed in series at six places as shown by FIG. 5. The lower structure elements 40 face on cell chambers (not shown) in the container 1, respectively. The upper structure 5 is composed of upper structure elements 50 shown in FIG. 4 which are installed in series at six places as shown by FIG. 7. The upper structure elements 50 face on the lower structure elements 40, respectively. The upper structure elements 50 are jointed by melting to the lower structure elements 40 so as to cover it each other at partition walls 6 & 7. Thus, an exhaust structure element 30 having a sectional structure shown in FIG. 8 is constructed. Namely, the exhaust structure 3 is composed of the exhaust structure elements 30 which are installed in series at six places.

As shown in FIG. 3, the lower structure element 40 is provided with a lower space 41 composing a lower part of a gas intake chamber 31 (FIG. 8), a lower space 42 composing a lower part of a refluxing chamber 32 (FIG. 8) and a lower space 43 composing a lower part of a passage chamber 33 (FIG. 8). As shown in FIG. 4, the upper structure element 50 is provided with an upper space 51 composing an upper part of the gas intake chamber 31 (FIG. 8), an upper space 52 composing an upper part of the refluxing chamber 32 (FIG. 8) and an upper space 53 composing an upper part of the passage chamber 33 (FIG. 8).

In the lower structure element 40, the lower space 41 is formed into a blow-by shape and the lower spaces 42 & 43 have bottom surfaces 42a & 43a. In the upper structure element 50, the upper spaces 51, 52 & 53 have ceilings 51a, 52a & 53a.

In the lower structure element 40, the lower space 41 and the lower space 42 adjacent to it connect each other through a vertical slit 81 made on a middle part of a partition wall 61, and the lower space 42 and the lower space 43 adjacent to it connect each other through a vertical slit 82 made on a middle part of a partition wall 62. The slit 82 is narrower than the slit 81.

A baffle plate 9 is installed in the lower space 41 of the lower structure element 40. The baffle plate 9 is composed of a horizontal plate 91 connecting to a lower end of the slit 81 and a vertical plate 92 located at tip end of the horizontal plate 91. The horizontal plate 91 is composed of a middle plate 91a connecting to the slit 81 and slanted portions 91b located at both sides of it.

A refluxing hole 10 is made on a bottom surface 42a of the lower space 42 of the lower structure element 40, at a middle part near to a side of the lower space 41. The refluxing hole 10 connects to a cylindrical body 11 formed at a backside of the bottom surface 42a. The cylindrical body 11 has such a sufficient length that its tip end can dip in the electrolyte, as shown by FIG. 8. 1a is a surface of the electrolyte.

In the lower structure element 40, the bottom surfaces 42a & 43a of the lower spaces 42 & 43 are consecutive each other and slanted toward a line 10a extending through the refluxing hole 10 and the slit 82 and further slanted toward the refluxing hole 10. In details, two surfaces 143a among the bottom surfaces 43a and two surfaces 142a among the bottom surfaces 42a are slanted while forming moderate curves convex upward.

In the upper structure element 50, a large number of pin-shaped bodies 12 & 13 extending downward are installed on the ceilings 52a & 53a of the upper spaces 52 & 53. The pin-shaped body 12 is made longer than the pin-shaped body 13. Among the pin-shaped bodies 13, one located near to the upper space 52 is made gradually longer than another distant from the upper space 52.

In the upper structure 5, a partition wall 71 of the adjoining upper spaces 53 is disconnected at its middle part. A wall portion 53b is so installed on the upper space 53 as to face on the disconnected portion 71a and with a slight clearance left between them. A height of the wall portion 53b is made a little lower than that of the partition wall 71. Consequently, in the exhaust structure 3, the adjoining passage chambers 33 of the exhaust structure element 30 connect each other through the disconnected portion 71a. In the exhaust structure 3, the adjoining gas intake chambers 31 of the exhaust structure element 30 are independent one from another and the adjoining refluxing chambers 31 of the exhaust structure element 30 are also independent one from another.

In the upper structure 5, exhaust passages 14 connecting to outside through filters are formed on the ceilings 53a of the upper spaces 53 located at both ends. 14a is a hole in which the filter is fitted.

Function of the exhaust structure 3 having the above composition will be described hereunder.

As shown by arrows in FIG. 8, gas produced in the container 1 comes into the gas intake chamber 31, comes through the slit 81 into the refluxing chamber 32, comes through the slit 82 into the passage chamber 33, comes through the disconnected portion 71a of the partition wall 71 into the adjoining passage chamber 33, moves toward the passage chambers 33 of the exhaust structure element 30 located at both ends of the exhaust structure 3, and finally is exhausted outside through the exhaust passages 14.

In such a process of gas movement, electrolyte contained in the gas is dewed on the pin-shaped bodies 12 when passing through the refluxing chamber 32, and further dewed on the pin-shaped bodies 13 when passing through the passage chamber 33. The electrolyte dewed on the pin-shaped bodies 12 & 13 drops on the bottom surfaces 42a & 43a, flows toward the refluxing hole 10, and drops in the container 1 through the refluxing hole 10. In this instance, the surface 1a of electrolyte in the container 1 moves up and down to cause an air pressure in the cylindrical body 11 to fluctuate so that the electrolyte coming into the refluxing hole 10 so sucked as to dropped in the cylindrical body 11.

Since the pin-shaped bodies 12 & 13 are installed, there is no chance for the electrolyte to be dewed on the ceilings 52a & 53a so that the electrolyte is prevented from remaining on the ceilings 52a & 53a while adhering thereto as it is.

The electrolyte flowing on the bottom surface 43a stands still for a while at this side of the slit 82, but positively flows through the slit 82 into the refluxing chamber 32 because the slit 82 is positioned at the lowest part of the bottom surface 43a.

Even when the electrolyte is splashed up due to violent shaking of the storage battery, the electrolyte is prevented from directly coming into the refluxing chamber 32 through the slit 81 owing to the baffle plate 9 installed in the gas intake chamber 31. Even if the electrolyte should come into the chamber, it drops in the container 1 through the refluxing hole 10 so that it scarcely comes into the passage chamber 33 through the narrow slit 82.

As described above, the electrolyte contained in the gas is separated from it when passing through the gas intake chamber 31, the refluxing chamber 32 and the passage chamber 33, so as to be refluxed in the container 1 through the refluxing hole 10. Accordingly, only gas containing no electrolyte will be exhausted outside from the exhaust passage 14 of the exhaust structure 3.

According to the exhaust structure of storage battery having the composition as described above, the following effects can be obtained.

(1) The gas produced in the container 1 can be moved to the passage chambers 33 of the exhaust structure element 30 located at both ends of the element structure 3 through the gas intake chamber 31, the slit 81, the refluxing chamber 32, the slit 82, the passage chamber 33, the disconnected portion 71a of the partition wall 71, and the adjoining passage chamber 33. Then, it can be exhausted outside through the exhaust passage 14. In this instance, the electrolyte contained in the gas is dewed on the pin-shaped bodies 12 & 13 and dropped on the bottom surfaces 42a & 43a, so that it can be refluxed into the container 1 through the refluxing hole 10. Namely, the electrolyte contained in the gas is separated from the gas to be refluxed into the container 1, so that only the gas can be exhausted.

(2) Since the air pressure in the cylindrical body 11 fluctuates when the surface 1a of the electrolyte in the container 1 moves up and down, the electrolyte coming into the refluxing hole 10 can be so sucked as to be dropped in the cylindrical body 11. Therefore, the electrolyte can be refluxed smoothly.

(3) The bottom surfaces 43a & 42a of the passage chamber 33 and the refluxing chamber 32 are slanted toward the refluxing hole 10, so that the electrolyte on the bottom surfaces 43a & 42a can be made flow smoothly toward the refluxing hole 10. In addition, the bottom surfaces 43a & 42a are slanted also toward the line 10 extending through the refluxing hole 10 and the slit 82, so that the electrolyte on the bottom surface 43a can be made flow smoothly through the slit 82 and together with the electrolyte on the bottom surface 42a toward the refluxing hole 10. Therefore, the electrolyte can be refluxed smoothly.

(4) Since the pin-shaped bodies 12 & 13 are installed, the electrolyte can be prevented from being dewed on the ceilings 52a & 53a and the electrolyte can be prevented from remaining on the ceilings 52a & 53a while adhering thereto as it is. Consequently, the electrolyte can be refluxed smoothly with a good efficiency.

(5) Even when the electrolyte is splashed up due to violent shaking of the storage battery, the electrolyte can be prevented from directly coming into the refluxing chamber 32 through the slit 81 owing to the baffle plate 9 installed in the gas intake chamber 31. In addition, this is dome more securely because the baffle plate 9 has the vertical plate 92. Even if the electrolyte should come into the chamber, the electrolyte can be refluxed before it comes in the passage chamber 33 because the refluxing chamber 32 is adjoining to the gas intake chamber 31. Accordingly, the electrolyte can be prevented positively from coming into the passage chamber 33 and being exhausted outside together with the gas.

I claim:

1. An exhaust structure of storage battery installed on a cover of a storage battery and permitting gas to be exhausted while preventing electrolyte from flowing out, in which the exhaust structure has exhaust structure elements equipped with gas intake chambers, refluxing chambers and passage chambers, in such a way that they face on every cell chambers of containers and arranged in horizontal positions in an arranged direction of cell chambers;

the gas intake chamber opens downward, the gas intake chamber and the refluxing chamber adjacent to it connect each other through a vertical first slit formed on a partition wall, and the refluxing chamber and a passage chamber adjacent to it connect each other through a vertical second slit formed on the partition wall;

the adjoining passage chambers of the exhaust structure elements connect each other through a clearance at an upper part of the partition wall;

the gas intake chamber has a baffle plate having at least a part projecting approximately in horizontal direction from a lower edge of the first slit;

the refluxing chamber has on its ceiling a large number of pin-shaped bodies extending downward and has a refluxing hole on its bottom surface, the refluxing hole connects to a cylindrical body extending downward, and the cylindrical body has such a sufficient length that its tip end can be dipped in the electrolyte;

the passage chamber has on its ceiling a large number of pin-shaped bodies extending downward;

the bottom surfaces of the passage chamber and the refluxing chamber are slanted toward the refluxing hole; and the exhaust passages connecting outside through filters are formed on the ceilings of the passage chambers of the exhaust structure elements located at both ends.

2. An exhaust structure of storage battery as set forth in claim 1, in which the baffle plate projects from a lower edge of the first slit in approximately horizontal direction, and its tip end stands upward.

3. An exhaust structure of storage battery as set forth in claim 1, in which the bottom surfaces of the passage chamber and the refluxing chamber are slanted also toward a line extending through the refluxing hole and the second slit.

* * * * *